United States Patent [19]

Prevot et al.

[11] Patent Number: 4,476,364
[45] Date of Patent: Oct. 9, 1984

[54] RADIO FREQUENCY HEATING SYSTEM FOR HEATING THERMOPLASTIC MATERIAL PREFORMS

[75] Inventors: Stephane C. Prevot; Suppayan M. Krishnakumar, both of Nashua, N.H.

[73] Assignee: The Continental Group, Inc., Stamford, Conn.

[21] Appl. No.: 308,977

[22] Filed: Oct. 6, 1981

[51] Int. Cl.³ .............................................. H05B 9/04
[52] U.S. Cl. .............................. 219/10.81; 219/10.69; 219/10.71; 425/174.8 E
[58] Field of Search ............... 219/10.81, 10.75, 10.71, 219/10.69, 10.57, 10.53, 10.43; 264/26, 535, DIG. 46; 425/174.4, 174.8 E, 174.8 R; 339/21 R, 21 S, 6, 9

[56] References Cited

U.S. PATENT DOCUMENTS

| 2,949,677 | 8/1960 | Cameron | 219/10.57 |
| 3,437,776 | 4/1969 | Schaeffer et al. | 219/10.81 |
| 4,119,826 | 10/1978 | Chambley et al. | 219/10.81 |
| 4,323,748 | 4/1982 | Likins | 219/10.71 |
| 4,342,895 | 8/1982 | Krishnakumar et al. | 219/10.81 |

FOREIGN PATENT DOCUMENTS

| 945869 | 7/1949 | Fed. Rep. of Germany | 219/10.81 |
| 567731 | 2/1945 | United Kingdom | 219/10.81 |

Primary Examiner—Roy N. Envall, Jr.
Assistant Examiner—M. M. Lateef
Attorney, Agent, or Firm—Charles E. Brown

[57] ABSTRACT

This relates to a radio frequency heating system for heating PET preforms. The system includes two parallel applicator plates or electrodes and the coupling of a radio frequency power supply thereto. Both the radio frequency applicators are isolated from radio frequency oven cavity and are electrically balanced and operated in a push-pull manner so as the net induced currents in the adjacent transport system are maintained to a minimum level and also the electric field strength between either the applicator plate and the transport system is half of that between the applicator plates. It also includes the use of inductors or stubs at specific points to provide for more uniform radio frequency voltage by reducing the voltage standing wave radio. Finally, it includes the proposal that the radio frequency oscillator vacuum tube may be mounted on one of the stubs or inductors and that the oscillator circuit need not be balanced in view of the very small proportion of the energy required by the load as compared to the overall energy in the applicator tank circuit and also that there is no need for the frequency tracking of the oscillator circuit to the load tank circuit.

14 Claims, 10 Drawing Figures

RADIO FREQUENCY HEATING SYSTEM FOR HEATING THERMOPLASTIC MATERIAL PREFORMS

This invention relates in general to new and useful improvements in the reheating of thermoplastic material preforms prior to the blow molding of such preforms, and more particularly to a novel radio frequency heating system particularly adapted for the reheating of PET preforms.

Thermoplastic material preforms are conventionally reheated by passing them through elongated ovens wherein they are gradually brought up to blow molding-orientation temperature. Such a reheating apparatus and method has numerous deficiencies among which is the required length of the oven and the number of preforms within the oven which must be discarded in the case of machine failure and stoppage.

Recent experiments with radio frequency heating has shown unexpected results in the heating of PET tubular preforms, particularly in the controlled heating of the preforms throughout the wall thickness thereof. However, initial experiments with radio frequency heating has indicated basic difficulties which have now been solved in accordance with this invention.

First of all, it is to be understood that the preforms must be conveyed between the plate applicators and therefore there must be provided a suitable carrier. It has been found most efficient to utilize elongated pallets which will carry on the order of twelve or more preforms. Also, it is necessary that the preforms be rotated during the heating to provide uniform heating of the preforms about their circumferences. This requires a separate holder mounted within the pallet for each preform and the holders must be rotatable relative to the pallet. Such holders or collets and pallets are preferably, for mechanical reasons, formed of metal, and it has been found that when one of the electrodes or applicator plates is electrically connected to the radio frequency oven cavity and the other applicator plate is isolated from the radio frequency oven cavity and driven by a radio frequency generator, due to the fact that the collets and pallet are also electrically connected to the radio frequency oven cavity, there is a tendency for arcing in the areas of moving parts and air dielectric breakdown at the radio frequency hot electrode.

In accordance with this invention, the above tendencies are greatly reduced by electrically balancing the applicator plates with respect to the collets and pallet.

It has also been found with the new system that radio frequency radiation leakage is also very much reduced.

It was also found that when the radio frequency energy source is connected to the parallel applicator plates, there is a voltage variation along the length of the plate due to standing wave along the electrical length of the plate and, since the heating of the preforms is directly proportional to the square of the voltage, this voltage variation materially affects the heating capabilities of the system.

It was first found that by connecting coil inductor or inductive stub to the electrode plates at suitable location, this voltage variation was reduced, but not sufficiently. It was also found that by placing a similar inductor or stub at each end of the plates, the magnitude of the voltage variation was the same. However, it was found that by placing the inductors or stubs at the one-quarter and three-quarter points along the applicator plates, there was a material reduction in the voltage variation along the electrical length of the plates. Further, it has been found that by making the electrically balanced applicator tank circuit the "frequency-determining-part" of the oscillator circuit, the frequency tracking problem is eliminated. Further, it has been found that, although a balanced push-pull oscillator circuit could be used in this application, a single tube unbalanced oscillator with appropriate electrical connections with one of the inductors or stubs can be used due to the high loaded Q of the applicator tank circuit.

With the above and other objects in view that will hereinafter appear, the nature of the invention will be more clearly understood by reference to the following detailed description, the appended claims, and the several views illustrated in the accompanying drawings.

IN THE DRAWINGS

FIG. 3b is a plotting of the voltage along the length of the applicator plates with the circuitry of FIG. 3a.

FIG. 4b is a plotting of the voltage along the length of the applicator plates with the system of FIG. 4a.

FIG. 5b is a plotting of the voltage along the applicator plates of FIG. 5a.

Figure 1:
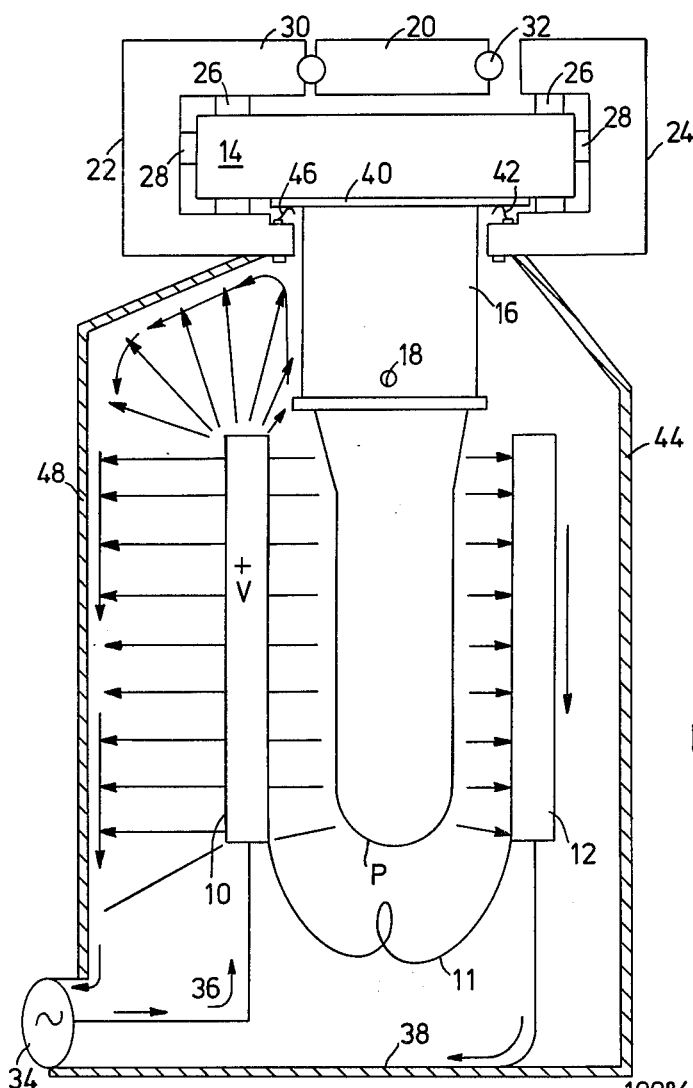
FIG. 1 is a schematic sectional view taken through a preform reheating oven as originally proposed.

Referring now to the drawings in detail, reference is first made to FIG. 1 wherein there is illustrated a typical radio frequency heating system of the type to which this invention relates. The basic system of FIG. 1 is disclosed in U.S. Pat. No. 4,342,895, granted Aug. 3, 1982.

The heating system illustrated in FIG. 1 includes a pair of parallel plate electrodes or applicators identified by the numerals 10, 12 and the inductor by 11. The applicator plates 10, 12 are mounted on the opposite sides of the path of preforms P which are to be reheated. It is to be understood that the preforms P will be conveyed continuously at a uniform rate and are rotated so that they will be evenly heated.

The preforms P are preferably conveyed utilizing an elongated pallet 14 which has mounted therein a plurality of depending collets 16 with the lower portion of each collet 16 having projecting into the interior thereof suitable retaining elements 18 whereby a preform P may be snapped into the respective collet 16 and be automatically retained therein.

Each collet 16 includes an upper collar portion 20 which is utilized to effect rotation of each collet and the preform carried thereby.

In order that the pallets 14 may move along a predetermined path, there is provided a pair of track members 22, 24 which are generally C-shaped in cross section. The pallet 14 is mounted for movement within the track members 22, 24 by means of vertical support rollers 26 and horizontal guide rollers 28.

At this time, it is pointed out that one of the track members, the track member 22, is provided with an upper flange 30 which projects toward the path of the collars 20 to a position closely adjacent to the collar 20. Further, each collar 20 has mounted about the exterior thereof a friction ring 32 which is preferably in the form of an O-ring. The friction ring 32 is engaged with the adjacent free edge of the upper flange 30 so that as the collar 20 moves relative to the track member 22, the collar 20 and the associated collet 16 as well as the preform carried thereby, are uniformly rotated.

When the heating system was first developed, the applicator plate 10 was electrically insulated from the radio frequency oven cavity and electrically connected to the radio frequency generator 34 by an electrical connection 36, while the applicator plate 12 was electrically connected to an electrically conductive wall 44 of the radio frequency oven cavity by strip 38. As a result, there was a high voltage between the applicator plates 10, 12 as required by the circuitry.

It is to be understood that currents were induced into the collets 16 and the pallet 14 with the result that it became necessary to provide sliding electrical contacts.

The sliding electrical contact is provided between metallic plate 40, which is electrically attached to Pallet 14 and the track member 24 by way of a resilient strip element 42 which is electrically attached to the track member 24 which in turn is electrically connected to the radio frequency oven cavity conductive wall 44. A similar sliding electrical contact is provided through members 40, 46 and 22 and another wall 48 of the oven cavity, which wall 48 also serves as an electrical conductor.

As is indicated by the arrows in FIG. 1, not only are there radio frequency current paths between the applicator plates 10, 12, but also, due to radiation, the plate 40 also carries a high level of radio frequency currents. The result with this system is that there was undesired arcing between the applicator plate 10 and the adjacent collets 16.

Figure 2:
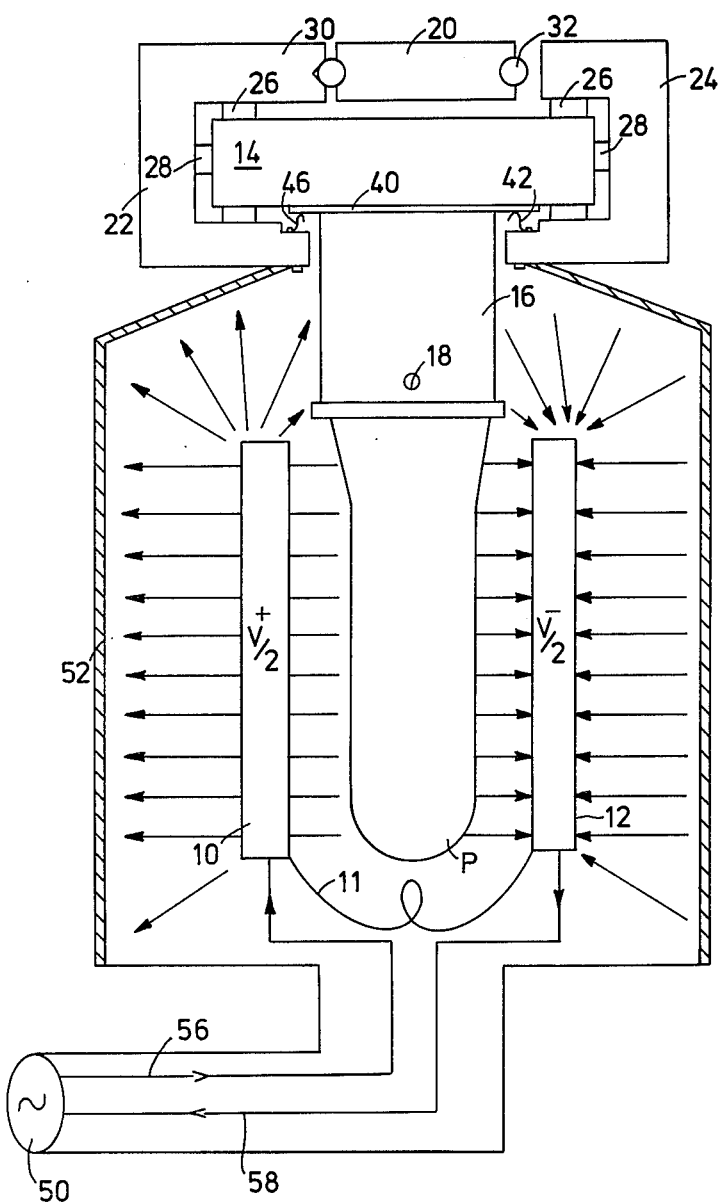
FIG. 2 is a schematic view similar to FIG. 1, but shows an electrically balanced applicator system with appropriate connections to a radio frequency energy source in accordance with this invention.

In accordance with this invention, the circuitry of FIG. 1 was improved as shown in FIG. 2. The two applicator plates 10, 12 are now isolated from the separate radio frequency oven cavity electrically conductive walls 52 and are electrically balanced and operated in a push-pull manner. The applicator plates are electrically connected to the radio frequency generator 50 through strips 56, 58. The track members 22, 24 are electrically connected to separate conductor forming walls of the radio frequency oven cavity through sliding electrical contacts 46, 42 in the same general manner as shown in FIG. 1. When each of these voltages are equal to one-half the voltage applied to the applicator plate 10 in the system of FIG. 1, it will be seen that the same voltage exists between the applicator plates 10, 12 as existed in the system of FIG. 1. However, the voltage between the applicator plate 10 and the collet 16 is now only on the order of one-half that of the system of FIG. 1. Of course, a like voltage exists between the collet 16 and the applicator plate 12.

It will be readily apparent from the foregoing that the system of FIG. 2 during each cycle, the applicator plates 10, 12 are electrically charged to the same potential but opposite polarities. With radio frequency voltages of $+V/2$ and $-V/2$ on the electrodes or applicator plates 10, 12, the applicator gap voltage is V voltage as exists in the system of FIG. 1, and preform heating is unchanged. However, any point at equal distance from each electrode is at zero potential. That is, any point on a plane parallel to the applicator plate surfaces and passing through the middle of the electrode gap is at a zero potential. This plane intersects the collet longitudinal axis and the longitudinal center of the pallet. Away from this vertical plane the potential is no longer null, and electrical currents will be induced on the metallic surfaces of the collets and pallets, but the cancellation effect will predominate close to the aforementioned vertical plane, and to a greater extent at distances larger than the electrode gap. Magnetically induced currents along the pallet are also minimized because equal amounts of currents flow on each of the applicator plates 10, 12 in opposite directions, likewise cancelling the effect of one another.

In accordance with the system of FIG. 2, the net electric field intensity provides for a balanced arrangement. Experimental evidence using a neon glow lamp in association with the system confirms the illustrated field distribution with the lamp glowing very bright in predicted areas of strong fields.

As a consequence, radio frequency currents passing through the contacts 42, 46 are reduced to the point where arcing is no longer a factor limiting oven performance. In fact, in a specially built balanced test stand oven, heating rates faster than expected were obtained without transport disturbance.

It is believed that with the system of FIG. 2 it may be possible greatly to increase the maximum permissible voltage V on the applicator plates as limited by electrode edge corona discharge limitations, to double that of the maximum electrode gap voltage permissible with the electrical circuitry of FIG. 1, thereby quadrupling the heating rate since the heating rate is proportional to the gap voltage squared.

Fast heating rates of thermoplastic material preforms, particularly PET, using parallel plate applicators requires both high radio frequency voltages and a high frequency of operation. This is due to the low dielectric loss of PET in particular.

Long electrode lengths permit either a large oven capacity for stationary bulk heating or a fast preform transport speed with the preforms being constantly in motion since the resident time between the radio frequency electrodes is increased.

The higher the rf frequency, the shorter the required lengths of the electrodes or applicator plates if a percentage of radio frequency voltage variations along the applicator plates is to be below a set limit.

With a frequency of 90 MHz, a wavelength in air is 132 inches. The standing wave of voltage on an open end section of applicator plate for a 30% change from maximum voltage to minimum voltage takes place along an eighth of a wavelength or 16.5 inches at 90 MHz.

When the radio frequency voltage drops to 70% of its value, the heating capacity drops to 50% as a result of the square law dependence of heating with respect to radio frequency voltage.

Attempts were first made to heat stationary preforms evenly distributed along applicator plates having a length of twenty-one inches. It was, of course, desired that the preforms be heated to substantially the same temperature. However, it was found that with the voltage variation along the applicator plates, non-uniform heating resulted.

A first attempt was made to reduce voltage variation by relocating the inductor or stub 11 centrally along the applicator plates 10, 12. With the radio frequency oscillator 50 connected to the applicator plates 10, 12, maximum voltage existed at the ends of the applicator plates with there being a gradual reduction in voltage toward the center as is shown in FIG. 3b.

Figure 4A:
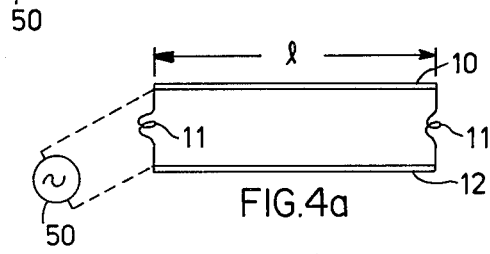
FIG. 4a is a circuit diagram showing the use of two inductors or stubs located on the applicator plates at each end.
Figure 4B:
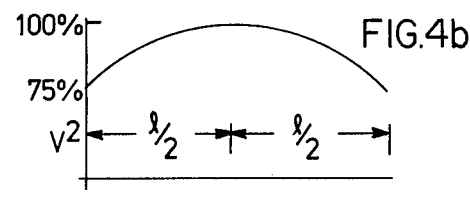

Next, with reference to FIG. 4a, it was decided to locate the inductor or stub 11 at opposite ends of the applicator plates 10, 12. With this arrangement, maximum voltage was at the center areas of the applicator plates with the voltage dropping off at the ends of the applicator plates, as shown in FIG. 4b.

Figure 5A:
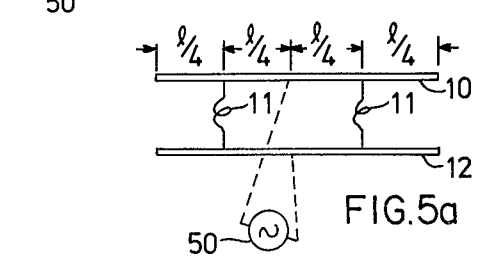
FIG. 5a is another circuit schematic showing the use of inductors or stubs located on the applicator plates at the quarter point.

Next, there was provided the arrangement shown in FIG. 5a wherein the inductors or stubs 11 located at the one-quarter and three-quarter points of the applicator plates 10, 12.

Figure 5B:
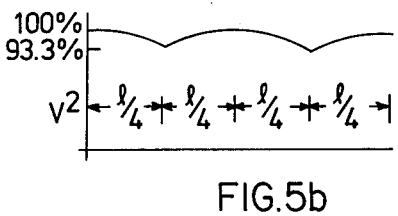

As shown in FIG. 5b, the voltage was a maximum at the ends and the center of the applicator plates and at a minimum at the one-quarter and three-quarter points. However, the voltage drop was minimal as compared to the voltage drop of FIGS. 3b and 4b. As shown in FIGS. 3b and 4b, the voltage drop would be on the order of 13.4% whereas with the arrangement of FIG. 5a the voltage drop would be only on the order of 3.4%. Furthermore, with only a 3.4% voltage drop, the heating drop is only 6.7% as compared to the 25% heating drop which occurred with the arrangements of FIGS. 3a and 4a.

All of the original experiments were conducted with applicator plates having a length of twenty-one inches. However, when the circuit arrangement of FIG. 5a proved to be so successful, attempts were made with forty-two inches long applicator plates. With inductors located at both ends of the applicator plates as shown in FIG. 4a, a twenty-one inch distance between minimum and maximum voltage exists, and the voltage was down to 46% at the ends of the applicator plates as compared to voltage at the center. This results in the heat drop at the ends of the applicator plates as being on the order of 70% from the heat effect in the center of the plates.

However, with forty-two inch applicator plates and with the inductors located 10.5 inches away from the plate ends, there is a maximum voltage drop of 12.2% and heating is reduced only 23% at its lowest point as compared to the 70% heat reduction with the arrangement of FIG. 4a.

In view of the foregoing, with the arrangement of FIG. 5a, it is now feasible to have relatively long applicator plates or electrodes which permit higher preform travelrates between the electrodes, and thus a greater capacity.

It was also found that the placement of the inductors or stubs was critical while the point of connection of the radio frequency energy source appeared to have little affect on voltage variation.

Figure 3A:
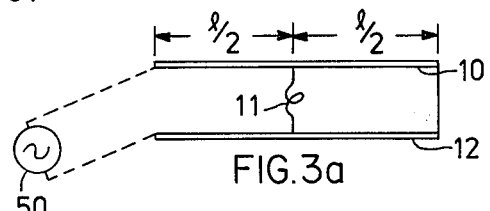
FIG. 3a is an electrical schematic showing the use of an inductor or stub located centrally along the length of the applicator plates to reduce voltage variation.
Figure 3B:
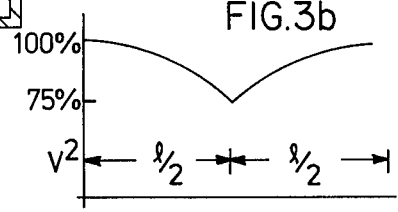

With respect to the circuitries of FIGS. 3a, 4a and 5a, the radio frequency oscillator 50 is a 90 MHz power oscillator coupled to the applicator tank circuit in a manner that match the high impedance characteristic of the preform load.

At 90 MHz, PET preforms being heated between parallel plate applicators or electrodes represent a high impedance load. When considering the necessary air gap between preforms and applicator plates plus the preform-to-preform separation required by the mold spacing, a typical load impedance value is within the range of 10K ohms to 100k ohms. This load impedance value is relatively high as compared to the applicator plate or electrode impedance which is estimated as being between 100 and 200 ohms. The impedance ratio, electrode impedance to load impedance, is on the order of 300 and is an indication of the Q value of the applicator resonant tank circuit if other circuit losses are minimized.

With the foregoing, two important consequences result, one advantageous and another disadvantageous. Advantageously, the system has a strong fly wheel effect, i.e. 300 times more energy is stored in the circuit than is dissipated. Although the applicator tank circuit is balanced electrically, the unbalanced radio frequency oscillator coupling can be such that it will deliver the relatively small dissipated part of the electrical energy required without disturbing the electrical balance of the system.

The disadvantageous consequence is that the high Q value results in a sharply defined resonant frequency. If the radio frequency oscillator has its own tank circuit frequency determination elements, then means for tracking the load tank circuit resonant frequency is required. The heating accuracy required to obtain preform temperatures within the required limits is high. A 1% change in radio frequency voltage on the applicator plates or electrodes results in more than 2% change in temperature rise. The excess change over the 2% is due to the non-linear heating characteristics of PET. Having temperature rises from 70° F. to 210° F., the 1% change in radio frequency voltage results in at least 3° F. preform temperature variation.

From the foregoing, it will be seen that the radio frequency tracking requirement becomes critical since small frequency deviation between the radio frequency generator and the load tuning results in a large radio frequency voltage change because of the high Q of the load circuit.

A single tube radio frequency oscillator uses the applicator load tank circuit as frequency determining elements maintaining the radio frequency voltage constant on the applicator plates or electrodes despite load fluctuations. This will thus elminate the frequency tracking difficulty.

Figure 6:
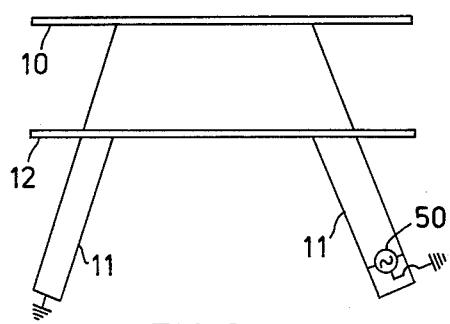
FIG. 6 is a circuit schematic showing the incorporation of the radio frequency oscillator along one of the stubs.

Referring now to FIG. 6, it will be seen that the system of FIG. 5a is modified by eliminating the direct connection of the radio frequency oscillator 50 to the applicator plates 10, 12 and the mounting of the radio frequency oscillator 50 in one of the inductors or stubs 11, as is shown in FIG. 6. Further, it will be seen that each end of the stubs 11 is electrically connected to the radio frequency oven cavity for better electrical balance.

The one oscillator tube circuit 50 is not itself balanced. However, the oscillator dumps small amounts of unbalanced current into the stub as compared to the circulating resonant currents hundreds of times larger due to the high circuit Q factors. In other words, the small amounts of current are so immaterial that any imbalance does not affect the overall system.

Figure 7:
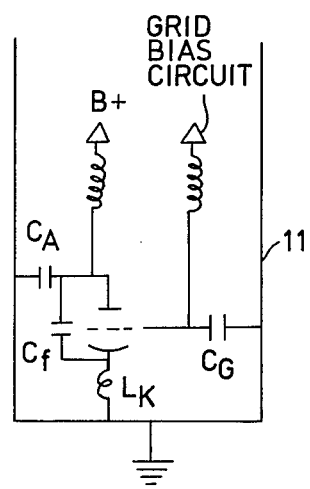
FIG. 7 is an enlarged wiring schematic showing the more specific details of the circuitry of the oscillator within the one stub.

In FIG. 7 there is illustrated a typical oscillator circuit which has been successfully utilized. The circuit is believed to be self-explanatory.

Although only preferred embodiments of the radio frequency heating system have been specifically illustrated and described herein, it is to be understood that minor variations may be made therein without departing from the spirit and scope of the invention as defined by the appended claims.

We claim:

1. A heating system for heating thermoplastic material preforms within a high frequency oven cavity to a blow molding orientation temperature, said heating system comprising said oven cavity being defined in part by transversely spaced apart separate electrically conductive walls, a pair of applicator plates arranged in a side-by-side transversely spaced relation within said oven cavity between said walls and in spaced adjacent relation thereto, conveyor means for continuously moving thermoplastic material preforms between said applicator plates, said conveyor means including pallets mounted for movement along a path and each pallet carrying a plurality of collets having means for retaining therein neck portions of depending preforms, a source of radio frequency energy connected to said applicator plates and to said oven walls, said pallets and said collets being formed of metal and being subjected to radio frequency energy directed to said applicator plates, said system including an electrical sliding contact system and said pallets being electrically connected through sliding contacts of said contact system to said walls of said radio frequency oven cavity.

2. A radio frequency heating system according to claim 1 wherein said system includes two separate conductive stubs each having terminal ends connected to said applicator plates, and said source of radio frequency energy being a radio frequency oscillator coupled in a single one of said stubs.

3. A radio frequency heating system according to claim 1 wherein said source of radio frequency energy is of the push-pull type wherein one of said applicator plates is positively charged and the other of said applicator plates is negatively charged whereby the voltage between one of said applicator plates and said collet is one-half the voltage between said applicator plates.

4. A radio frequency heating system according to claim 3 wherein said system includes two separate conductive stubs each having terminal ends connected to said applicator plates, and said source of radio frequency energy being a radio frequency oscillator coupled in a single one of said stubs.

5. A radio frequency heating system according to claim 4 wherein said radio frequency oscillator includes a radio frequency vacuum tube that is connected near the end of said one stub such that the oscillator frequency is determined by an applicator tank circuit.

6. A radio frequency heating system according to claim 5 wherein said radio frequency oscillator is unbalanced without appreciably affecting the balance of the applicator circuit due to the high loaded Q of the said circuit.

7. A radio frequency heating system according to claim 4 wherein said radio frequency oscillator is unbalanced without appreciably affecting the balance of the applicator circuit due to the high loaded Q of the said circuit.

8. A radio frequency heating system according to claim 4 wherein each of said stubs are connected to said applicator plates in spaced relation to one another and to ends of said applicator plates.

9. A radio frequency heating system according to claim 2 wherein each of said stubs are connected to said applicator plates in spaced relation to one another and to ends of said applicator plates.

10. A radio frequency heating system comprising a radio frequency oven cavity defined in part by two separate transversely spaced electrically conductive walls, a pair of applicator plates arranged in side-by-side transversely spaced relation within said oven between said walls and in adjacent transversely spaced relation to said walls, conveyor means for continuously moving thermoplastic material members through said oven between said applicator plates, a source of radio frequency energy connected to said applicator plates, said system including two separate conductive stubs each having terminal ends connected to said applicator plates, and said source of radio frequency energy being a radio frequency oscillator coupled in a single one of said stubs.

11. A radio frequency heating system according to claim 10 wherein said radio frequency oscillator is unbalanced without appreciably affecting the balance of the applicator circuit due to the high loaded Q of the said circuit.

12. A radio frequency system according to claim 10 wherein each of said stubs are connected to said applicator plates in spaced relation to one another and to ends of said applicator plates.

13. A radio frequency heating system according to claim 10 wherein said radio frequency oscillator includes a radio frequency vacuum tube that is connected near the end of said one stub such that the oscillator frequency is determined by an applicator tank circuit.

14. A radio frequency heating system according to claim 10 wherein said source of radio frequency energy being of the push-pull type wherein one of said applicator plates is positively charged and the other of said applicator plates is negatively charged whereby the voltage between one of said applicator plates and an adjacent one of said oven walls is one-half the voltage between said applicator plates.

* * * * *